(12) United States Patent
Kim

(10) Patent No.: US 9,747,464 B2
(45) Date of Patent: Aug. 29, 2017

(54) IMAGE PROCESSING APPARATUS AND CONTROL METHOD THEREOF

(71) Applicant: SAMSUNG ELECTRONICS CO., LTD., Suwon-si (KR)

(72) Inventor: Je-ik Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/789,369

(22) Filed: Jul. 1, 2015

(65) Prior Publication Data

US 2016/0004878 A1    Jan. 7, 2016

(30) Foreign Application Priority Data

Jul. 1, 2014 (KR) .................. 10-2014-0081799

(51) Int. Cl.
*G06F 21/62* (2013.01)
*G06F 12/14* (2006.01)
*H04N 21/426* (2011.01)
*H04N 21/44* (2011.01)
*H04N 21/4405* (2011.01)
*H04N 21/443* (2011.01)

(52) U.S. Cl.
CPC ...... *G06F 21/6218* (2013.01); *G06F 12/1408* (2013.01); *G06F 12/1425* (2013.01); *H04N 21/42623* (2013.01); *H04N 21/44004* (2013.01); *H04N 21/4405* (2013.01); *H04N 21/4435* (2013.01); *G06F 2212/1052* (2013.01)

(58) Field of Classification Search
CPC ............. G06F 21/6218; G06F 12/1408; G06F 12/1425; H04N 21/42623; H04N 21/44004; H04N 21/4405; H04N 21/4435

USPC ........................................................ 713/193
See application file for complete search history.

(56) References Cited

U.S. PATENT DOCUMENTS

| 2002/0163522 | A1 | 11/2002 | Porter et al. |
| 2007/0016799 | A1* | 1/2007 | Klint ............... G06F 21/79 713/189 |
| 2010/0293392 | A1 | 11/2010 | Miyamoto |
| 2011/0202776 | A1* | 8/2011 | Chen ............... G06F 21/64 713/193 |
| 2013/0160148 | A1 | 6/2013 | Gangotri et al. |
| 2014/0020111 | A1 | 1/2014 | Wang et al. |

FOREIGN PATENT DOCUMENTS

EP    2075725 A2    7/2009

OTHER PUBLICATIONS

Communication dated Oct. 1, 2015, issued by the European Patent Office in counterpart European Application No. 15172877.1.
Communication dated Jan. 30, 2017, issued by the European Patent Office in counterpart European application No. 15172877.1.

* cited by examiner

*Primary Examiner* — Amir Mehrmanesh
*Assistant Examiner* — Sakinah Taylor
(74) *Attorney, Agent, or Firm* — Sughrue Mion, PLLC

(57) ABSTRACT

An image processing apparatus includes: a central processing unit (CPU) configured to process data; a random access memory (RAM) which includes a first storage area which stores the data processed by the CPU and a second storage area different from the first storage area; and a RAM controller configured to authorize the CPU to access the first storage area and block the CPU from accessing the second storage area so that the data loaded to the second storage area can be prevented from being copied by the CPU.

12 Claims, 7 Drawing Sheets

IMAGE PROCESSING APPARATUS AND CONTROL METHOD THEREOF

CROSS-REFERENCE TO RELATED APPLICATION

This application claims priority from Korean Patent Application No. 10-2014-0081799, filed on Jul. 1, 2014 in the Korean Intellectual Property Office, the entire disclosure of which is incorporated herein by reference in its entirety.

BACKGROUND

Field

Apparatuses and methods consistent with the exemplary embodiments relate to an image processing apparatus capable of implementing various pieces of data such as image data and a control method thereof, and more particularly, to an image processing apparatus having a structure for preventing content data, which is protected by digital rights management (DRM), from being hacked and a control method thereof.

Related Art

An image processing apparatus processes external image signal/image data in accordance with a variety of image processing techniques. The image processing apparatus displays the processed image data as an image on its own display panel, or outputs the processed image data to a display apparatus having a display panel so that the display apparatus can display the received image data as the image. That is, the image processing apparatus may have a display panel or no display panel as long as it can process the image data. For example, the former includes a television (TV), and the latter includes a set-top box.

Digital content data provided by the image processing apparatus may be allowed to be copied freely, or its copyright may be protected by digital rights management (DRM). The DRM may be achieved in various forms, and is provided to prevent an unauthorized third party from duplicating content data of the image processing apparatus without permission. For instance, the image processing apparatus has to prevent content data, to which the DRM is applied, from being duplicated and leaking to an external apparatus whereas the corresponding content data is allowed to be decoded in the image processing apparatus and displayed as an image. However, if operations of an internal configuration of the image processing apparatus are not restricted, it is impossible to prevent the content data from leaking outside the image processing apparatus. Accordingly, the image processing apparatus may need a configuration and a design for protecting the content data.

SUMMARY

According to an aspect of an exemplary embodiment, there is provided an image processing apparatus including: a central processing unit (CPU) configured to process data; a random access memory (RAM) configured to include a first storage area which stores the data processed by the CPU and a second storage area different from the first storage area; and a RAM controller configured to authorize the CPU to access the first storage area and block the CPU from accessing the second storage area so that the data loaded to the second storage area can be prevented from being copied by the CPU.

The image processing apparatus may further include: a display; and a decoder configured to decode image data and output the decoded data to be displayed as an image on the display, wherein the RAM controller may authorize the decoder to access the second storage area so that the decoder can decode the image data stored in the second storage area.

The image processing apparatus may further include a descrambler configured to decrypt encrypted data loaded into the first storage area by the CPU and load the decrypted data into the second storage area, wherein the RAM controller may authorize the descrambler to access the second storage area.

The descrambler may receive a decryption key for decryption from the CPU.

The RAM controller may block the CPU from reading from and writing to the second storage area and may authorize the descrambler to write to the second storage area.

The image processing apparatus may further include a register configured to store information about authorities of the CPU and the decoder to access each of the first storage area and the second storage area, wherein the RAM controller may selectively restrict the access of the CPU and the decoder to the RAM based on the information stored in the register.

The register may include a read only memory (ROM).

The first storage area and the second storage area may include areas with physical address ranges not overlapping with each other.

According to yet another aspect of another exemplary embodiment, there is provided a method of controlling an image processing apparatus, the method including: loading data to a random access memory (RAM) including a first storage area and a second storage area different from the first storage area; authorizing a central processing unit (CPU) to access the first storage area so that the CPU can process the data loaded to the first storage area; and blocking the CPU from accessing the second storage area so that the data loaded to the second storage area can be prevented from being copied by the CPU.

The method may further include: authorizing the decoder to access the second storage area so that the decoder can decode the data stored in the second storage area and output the decoded data to be displayed as an image on a display.

The method may further include: loading into the second storage area data that is decrypted by a descrambler for decrypting encrypted data stored in the first storage area by the CPU; and authorizing the descrambler to access the second storage area.

The loading into the second storage area the decrypted data may include, receiving a decryption key for decryption, by the descrambler, from the CPU.

The authorizing the access of the descrambler may include blocking the CPU from reading from and writing to the second storage area, and authorizing the descrambler to write to the second storage area.

The image processing apparatus may further include a register configured to store information about authorities of the CPU and the decoder to access each of the first storage area and the second storage area, and the method may further include selectively restricting the access of the CPU and the decoder to the RAM based on the information stored in the register.

The first storage area and the second storage area may include areas with physical address ranges not overlapping with each other.

According to yet another aspect of another exemplary embodiment, there is provided an image processing apparatus including: a central processing unit (CPU) configured to process data; a random access memory (RAM) configured to store the data processed by the CPU; and a RAM controller configured to selectively restrict access of the CPU to the RAM, wherein the RAM controller divides the RAM into a first storage area to which the data processed by the CPU is stored and a second storage area different from the first storage area, and blocks the CPU from accessing the second storage area so that the data loaded to the second storage area can be prevented from being copied by the CPU.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. In the following exemplary embodiments, only elements directly related to the exemplary embodiment will be described, and descriptions about the other elements will be omitted. However, it will be appreciated that the elements, the descriptions of which are omitted, are not unnecessary to realize the apparatus or system according to exemplary embodiments.

Figure 1:
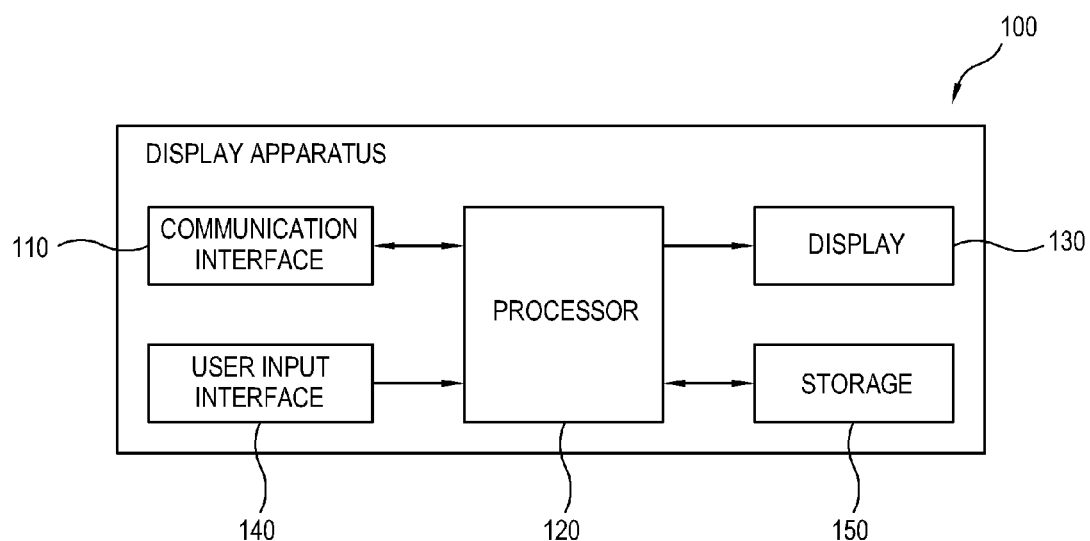
FIG. 1 is a block diagram illustrating an image processing apparatus according to an exemplary embodiment.

FIG. 1 is a block diagram illustrating an image processing apparatus according to an exemplary embodiment.

As shown in FIG. 1, the image processing apparatus 100 according to an exemplary embodiment has a structure for displaying an image by itself such as a television (TV). However, an exemplary embodiment is not limited to the display apparatus and may be applied to a set-top box or the like that cannot display an image by itself or an electronic device having various functions. Thus, the scope of an inventive concept is not limited to exemplary embodiments described herein.

The image processing apparatus 100 displays an image by processing external image data in real time, or by first storing the image data and then processing the image data at a set time. The image processing apparatus 100 may execute various applications under an operating system and thus provide functions desired by a user.

The image processing apparatus 100 in an exemplary embodiment includes a communication interface 110 which communicates with external apparatuses to transmit and receive data/a signal; a processor 120 which processes the data received via the communication interface 110 in accordance with a preset process; a display 130 which displays image data as an image if the data processed by the processor 120 is image data; a user input interface 140 through which a user's input operation is performed and received; and a storage 150 which stores data/information.

The communication interface 110 transmits/receives data so that interactive communication can be performed between the image processing apparatus 100 and a server (not shown) or the like external devices (not shown). The communication interface 110 accesses the external device (not shown) through wired/wireless wide/local area networks or locally in accordance with one or more preset communication protocols.

The communication interface 110 may include connection ports according to devices or an assembly of connection modules, in which the protocol for connection or a target for connection is not limited to one kind or type of the external device (not shown). The communication interface 110 may be internal i.e., in the image processing apparatus 100, but is not limited thereto and is provided by way of an example only. Alternatively, the entire or a part of the communication interface 110 may be added to the image processing apparatus 100 in the form of an add-on or dongle type i.e., may be external to the image processing apparatus 100.

The communication interface 110 transmits/receives a signal in accordance with protocols designated according to the connected devices, in which the signals can be transmitted/received based on individual connection protocols with regard to the connected devices, according to an exemplary embodiment. In the case of image data, the communication interface 110 may transmit/receive the signal bases on various standards such as a radio frequency (RF) signal, composite/component video, super video, Syndicat des Constructeurs des Appareils Radiorécepteurs et Téléviseurs (SCART), high definition multimedia interface (HDMI), display port, unified display interface (UDI), or wireless HD, etc.

The processor 120 performs various processes with regard to data/a signal received in the communication interface 110. If the communication interface 110 receives the image data, the processor 120 applies an imaging process to the image data and the image data processed by this process is output to the display 130, thereby allowing the display 130 to display an image based on the corresponding processed image data. If the signal received in the communication interface 110 is a broadcasting signal, the processor 120 extracts video, audio and appended data from the broadcasting signal tuned to a certain channel, and adjusts an image to have a preset resolution, so that the image can be displayed on the display 130, according to an exemplary embodiment.

There is no limit to the type of imaging processes to be performed by the processor 120. For example, there are decoding corresponding to an image format of the image data, de-interlacing for converting the image data from an interlace type into a progressive type, scaling for adjusting the image data to have a preset resolution, noise reduction for improving image qualities, detail enhancement, frame refresh rate conversion, etc.

The processor 120 may perform various processes in accordance with the types and attributes of data, and thus the process to be implemented in the processor 120 is not limited to the image processing. In addition, the data that can be processed in the processor 120 is not limited to only that received via the communication interface 110. For example, the processor 120 implements a preset operation or a function in response to a control command if a user inputs the corresponding control command through the user input interface 140.

The processor 120 may be an individual chip-set capable of independently performing such respective processes, or a group of modules corresponding to functions, or a system-on-chip where various functions are integrated. In an exemplary embodiment, the processor may be hardware or a combination of hardware and software.

The display 130 displays the video signal/the image data processed by the processor 120 as an image. The display 130 may be achieved by various display types such as liquid crystal, plasma, a light-emitting diode, an organic light-diode, a surface-conduction electron-emitter, a carbon nano-tube and a nano-crystal, but not limited thereto and is provided by way of an example only.

The display 130 may additionally include an appended element depending on the type of the display 130. For example, the liquid crystal type display 130 may include a liquid crystal display (LCD) panel (not shown), a backlight unit (not shown) which emits light to the LCD panel, a panel driving substrate (not shown) which drives the panel (not shown), etc. This is provided by way of an example and not by way of a limitation.

The user input interface 140 transmits a variety of preset control command or information to the processor 120 in accordance with a user's control or input. The user input interface 140 receives various events input by a user in accordance with a user's intention and transmits it to the processor 120. Here, the events generated by a user may be provided in various forms, for example, a user's control on a remote controller, a user's speech, a user's gesture, etc. This is provided by way of an example only and not by way of a limitation. For example, the user input interface may receive input from user input devices such as a keyboard, a mouse, a microphone, and so on.

The storage 150 stores various pieces of data under the control of the processor 120. The storage 150 may be a nonvolatile memory such as a flash memory, a hard disk drive, etc. so as to retain data regardless of power on/off of the system, according to an exemplary embodiment. The storage 150 is accessed by the processor 120 so that previously stored data can be read, written, edited, deleted, updated, and so on.

According to an exemplary embodiment, the image processing apparatus 100 receives content data through the communication interface 110 and processes the data using the processor 120 so that an image based on the processed data can be displayed on the display 130. If the content data is encrypted data to be decrypted by only a certain decryption key for preventing illegal reproduction, the image processing apparatus 100 decrypts and then decodes the content data to be displayed as an image. According to an exemplary embodiment, the decrypted data, i.e., data that can be copied and edited since it is not encrypted, and will be referred to as raw data.

The content data is encrypted to prevent an unauthorized third party from copying and leaking the content data without permission. Further, if a user is not authorized to copy the content data but only to view content data, s/he is allowed to view the content data and forbidden from copying the content data.

Figure 2:
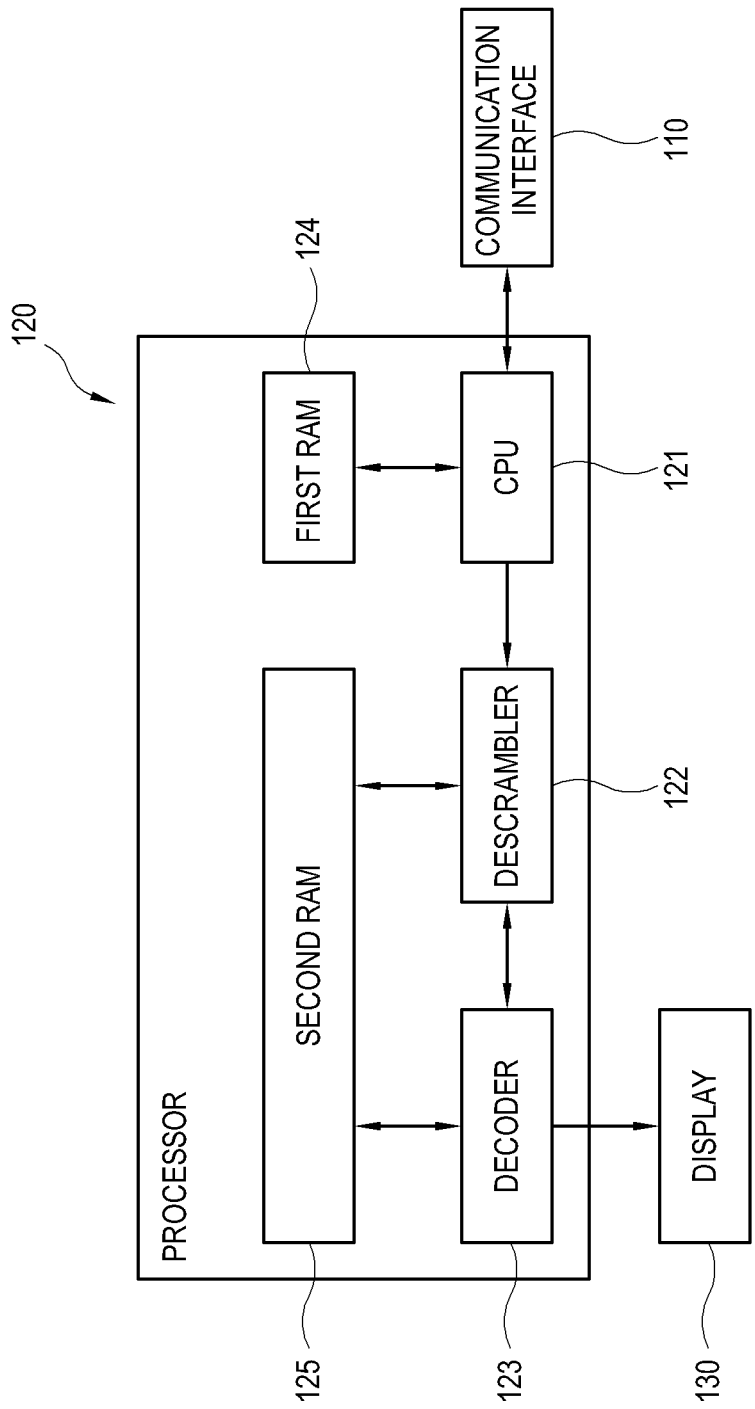
FIG. 2 is a block diagram of a processor in an image processing apparatus according to an exemplary embodiment.

With reference to FIG. 2, below will be described a configuration for preventing decrypted content data from being hacked while encrypted content data is decrypted in the image processing apparatus 100 and displayed as an image, according to an exemplary embodiment.

FIG. 2 is a block diagram illustrating a processor such as the processor 120, according to an exemplary embodiment. In FIG. 2, only elements directly related to an exemplary embodiment are illustrated to avoid unnecessary details. In practice, the processor 120 may include additional elements not described in an exemplary embodiment.

As shown in FIG. 2, the processor 120 includes a central processing unit (CPU) 121, a descrambler 122 for decrypting encrypted data, a decoder 123 for decoding data to be displayed as an image, a first random access memory (RAM) 124 to which data executed by the CPU 121 is loaded, and a second RAM 125 to which data processed by the decoder 123 is loaded.

The descrambler 122 and the decoder 123 are described as individual elements, but not limited thereto and may be given as an integrated element, according to an exemplary embodiment. However, the first RAM 124 and the second RAM 125 are physically separated from each other, according to an exemplary embodiment.

The CPU 121 carries out operations for data processed by the processor 120, and executes an operating system, an application, and the like software. In other words, according to an exemplary embodiment, operations of software i.e., codes of the software, are processed and executed by the CPU 121. Data to be processed by the CPU 121 should first be loaded to the first RAM 124. If data to be processed is not loaded to the first RAM 124, the CPU 121 cannot process the corresponding data. For example, the CPU 121 is physically separated from the first RAM 124, and cannot process data of the second RAM 125 which blocks access of the CPU 121, according to an exemplary embodiment.

The descrambler 122 decrypts the encrypted data if the encrypted data is received from the CPU 121. According to an exemplary embodiment, the descrambler 122 may already have a decryption key for decryption, or may receive the decryption key from the CPU 121 while receiving the encrypted data. The descrambler 122 loads the encrypted data received from the CPU 121 into the second RAM 125 and decrypts this data based on the decryption key.

If the data received from the CPU 121 is the raw data that is not encrypted, the descrambler 122 loads the corresponding data into the second RAM 125 without processing the data and then transfers authority to control operations to the decoder 123, according to an exemplary embodiment. Alternatively, the CPU 121 may transfer the raw data to the decoder 123 by bypassing the descrambler 122, according to an exemplary embodiment.

The decoder 123 decodes content data decrypted by the descrambler 122 and loaded into the second RAM 125, or content data received from the CPU 121 and loaded into the second RAM 125, based on a preset image format. The decoder 123 outputs the decoded data to the display 130, thereby displaying an image based on the corresponding data.

The first RAM 124 and the second RAM 125 are volatile memories into which data processed by components of the processor 120 is temporarily loaded, according to an exemplary embodiment. Although not illustrated, a RAM controller (not shown) may be added to control access of the CPU 121, the descrambler 122, the decoder 123 to the first RAM 124 and the second RAM 125.

In an exemplary embodiment, the first RAM 124 and the second RAM 125 are physical, tangible memories that are physically separate from each other. In particular, the CPU 121 may access data loaded into the first RAM 124, but is restricted (cannot) access data loaded into the second RAM 12. In terms of access authority, the descrambler 122 and the decoder 123 are allowed to read and write to the second RAM 125, but the CPU 121 is prevented from both reading and writing to the second RAM, according to an exemplary embodiment.

A process of displaying an image based on the encrypted content data received from an external apparatus i.e., from the outside of the display apparatus, according to an exemplary embodiment will be described with reference to FIG. 3.

Figure 3:
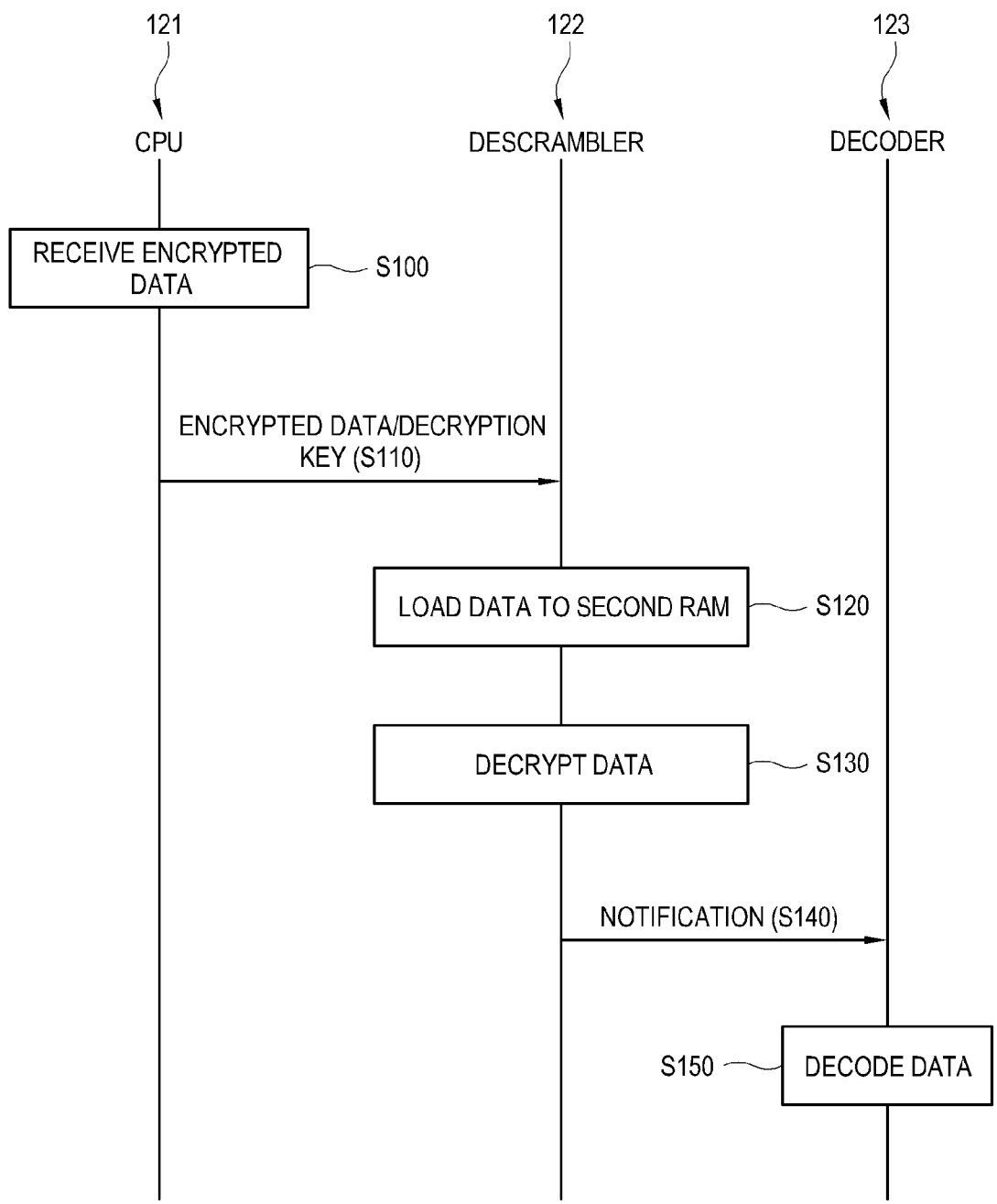
FIG. 3 is a flow diagram illustrating processing of an encrypted content according to an exemplary embodiment.

FIG. 3 is a flow diagram illustrating processing of an encrypted content according to an exemplary embodiment.

As shown in FIG. 3, in operation S100, the CPU 121 receives the encrypted data from the communication interface 110 and loads the received encrypted data to the first RAM 124. In operation S110, the CPU 121 transmits the encrypted data and the decryption key to the descrambler 122.

The descrambler 122 loads the encrypted data to the second RAM 125, in operation S120, and decrypts the loaded data using the decryption key, in operation S130. When the decryption of the data is completed, the descrambler 122 notifies the decoder 123 of the completed decryption, in operation S140.

In operation S150, the decoder 123 decodes the data loaded to the second RAM 125 and outputs the decoded data to the display 130.

The decryption of an encrypted content to be displayed as an image is schematically performed, by the processor, as described above, according to an exemplary embodiment.

Under the foregoing structure and operations, an unauthorized third party may try to hack and copy the raw data decrypted by the descrambler 122. Basically, the hacking is achieved in such a manner that a third party takes over the authority to issue a command from the CPU 121 and controls operations of the CPU 121. However, in an exemplary embodiment, the raw data is loaded to the second RAM 125, which the CPU 121 cannot access. Therefore, even though a third party can control the operations of the CPU 121, it is impossible for the third party to take the raw data loaded to the second RAM 125. In other words, a third party can take only the encrypted data loaded to the first RAM 124.

According to an exemplary embodiment, decrypted data is prevented from leaking even though a third party tries to hack the data by depriving the CPU 121 of the control authority.

In a variation of an exemplary embodiment, the elements of the processor 120 may use a single RAM without installing the plurality of physically separated RAMs 124 and 125 as in the above-described exemplary embodiment, and this variation will be described below by way of an example as a second exemplary embodiment.

Figure 4:
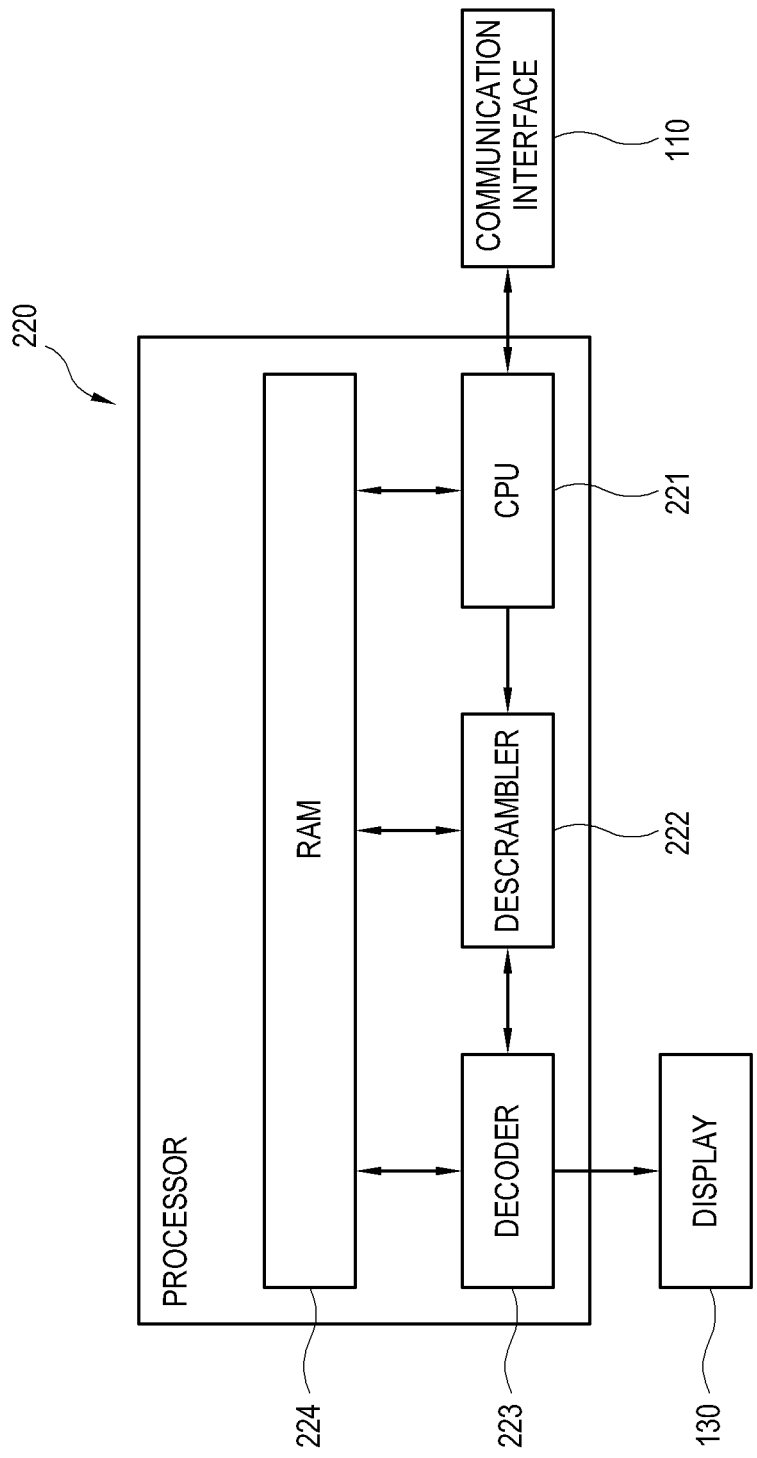
FIG. 4 is a block diagram of a processor according to yet another exemplary embodiment.

FIG. 4 is a block diagram of a processor according to yet another exemplary embodiment, which is described as a second exemplary embodiment. The processor 220 according to the second exemplary embodiment may be embodied in the image processing apparatus 100 instead of the processor 120 described in the above exemplary embodiment, referred to as the first exemplary embodiment.

As shown in FIG. 4, the processor 220 includes a CPU 221, a descrambler 222, a decoder 223, and an RAM 224. According to an exemplary embodiment, fundamental operations of the CPU 221, the descrambler 222, the decoder 223 are the substantially analogous to those described above with reference to the first exemplary embodiment.

However, the RAM 224 according to the second exemplary embodiment is not the plurality of physically separated RAMs such as the ones described above in the first exemplary embodiment, and is shared by the CPU 221, the descrambler 222, and the decoder 223. There could be various reasons for this design of the RAM 224 such as to further reduce manufacture costs of the apparatus in comparison to the first exemplary embodiment.

Processing of an encrypted content, according to a second exemplary embodiment, will be described below with reference to FIG. 5.

Figure 5:
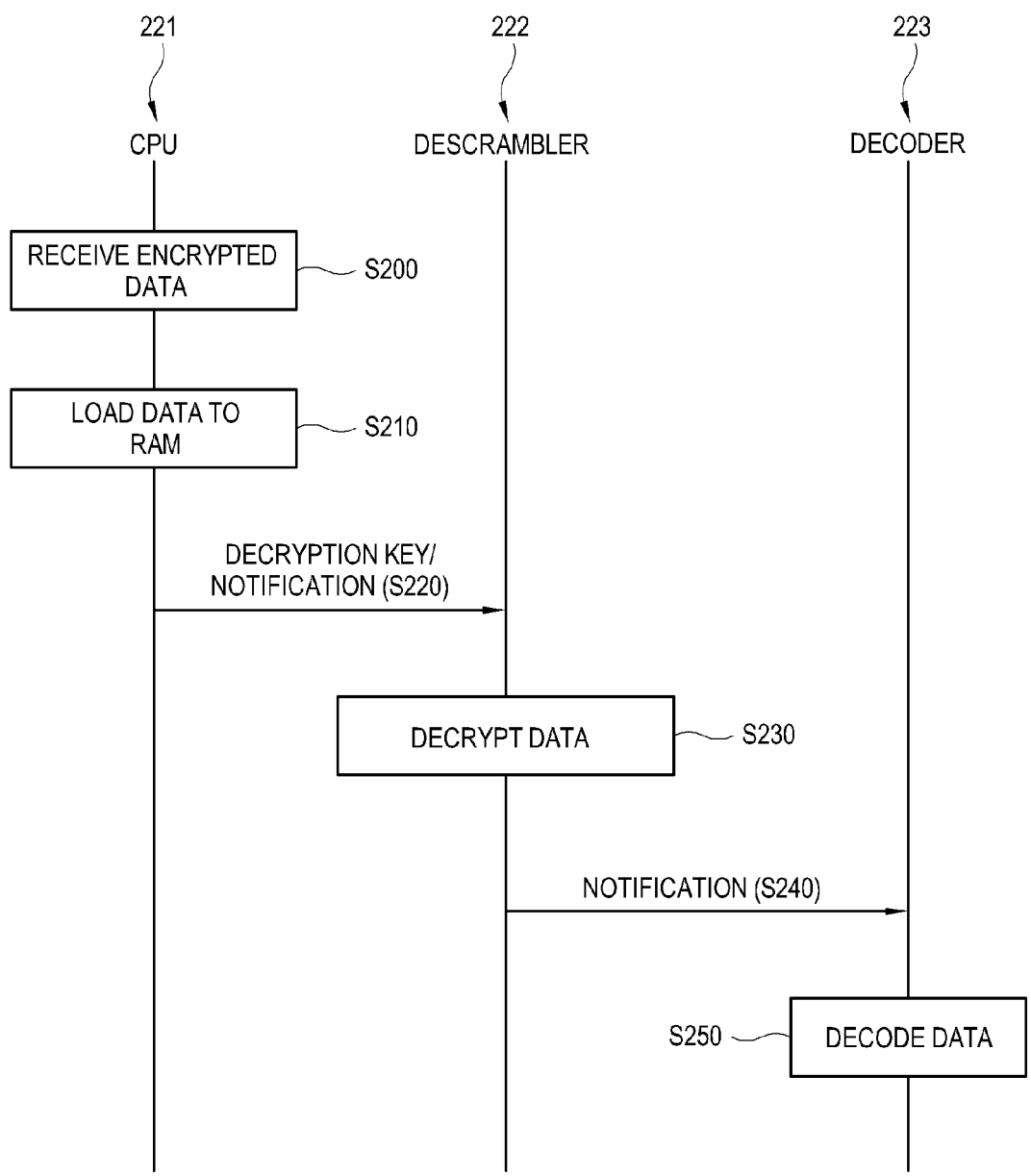
FIG. 5 is a flow diagram illustrating processing of an encrypted content according to yet another exemplary embodiment.

FIG. 5 is a flow diagram illustrating processing of an encrypted content, according to yet another exemplary embodiment such as the second exemplary embodiment.

As shown in FIG. 5, if the CPU 221 receives an encrypted content data in operation S200, the CPU 221 loads the received data to the RAM 224, in operation S210. In operation S220, the CPU 221 notifies the descrambler 222 that the encrypted data is loaded to the RAM 224, and transmits the decryption key to the descrambler 222.

In operation S230, the descrambler 222 decrypts the encrypted data loaded to the RAM 224 by using the decryption key. The state that the decrypted data is loaded to the RAM 224 is continued. In operation S240, the descrambler 222 notifies the decoder 223 that the data is decrypted.

In operation S250, the decoder 223 decodes the decrypted data that was loaded to the RAM 224, and outputs the decoded data to the display 130.

Under the foregoing structure and operations, an unauthorized third party may try to hack and copy the raw data decrypted by the descrambler 222. In an exemplary embodiment such as the second exemplary embodiment, the raw data is loaded to the RAM 224 to which the CPU 221 can have access. Therefore, if a third party succeeds in controlling the CPU 221, the raw data is copied and leaked by the third party.

When the processor 220 uses the single RAM 224 according to the second exemplary embodiment, there is a need of a structure for blocking a third party from accessing the raw data by taking over the control authority of the CPU 221. To this end, a third exemplary embodiment which prevents the third party from accessing raw data by taking control of the CPU is described according to yet another exemplary embodiment referred to as a third exemplary embodiment.

Figure 6:
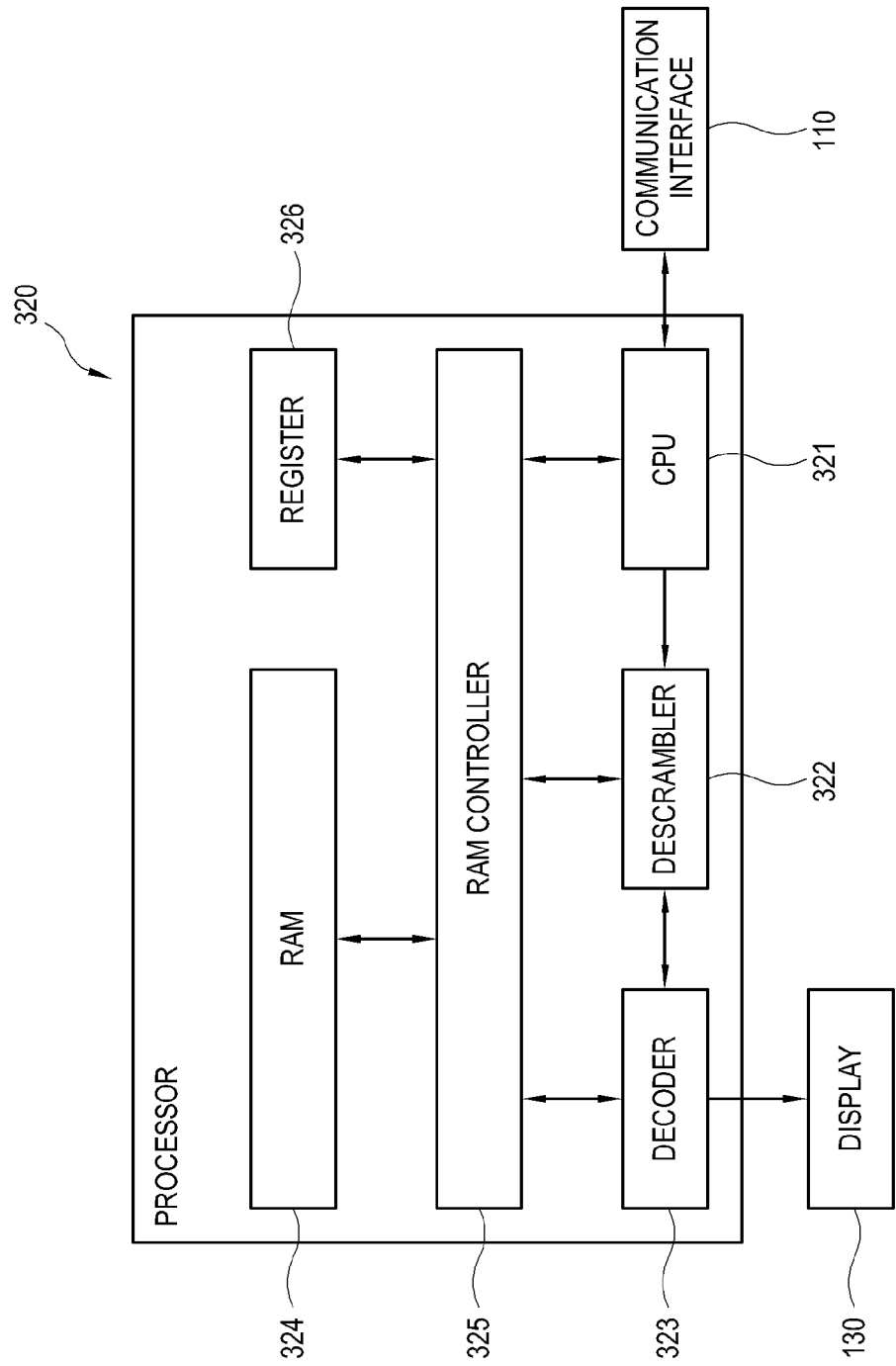
FIG. 6 is a block diagram illustrating a processor according to yet another exemplary embodiment.

FIG. 6 is a block diagram illustrating a processor according to yet another exemplary embodiment referred to as a third exemplary embodiment. In the third exemplary embodiment, the processor 320 may be part of the image processing apparatus 100 instead of the processor 120 of the first exemplary embodiment.

As shown in FIG. 6, the processor 320 includes a CPU 321, a descrambler 322, a decoder 323, a RAM 324, and a RAM controller 325. The CPU 321, the descrambler 322 and the decoder 323 have substantially analogous functions as those of the foregoing exemplary embodiments, and therefore detailed descriptions thereof will be omitted.

The RAM controller 325 controls access of the CPU 321, the descrambler 322 and the decoder 323 to the RAM 324. That is, each of the CPU 321, the descrambler 322 and the decoder 323 can have access to data loaded to the RAM 324 under the control of the RAM controller 325. The RAM controller 325 can authorize the components of the processor 320 to individually access the RAM 324, thereby restricting access of each component of the processor 320 to the RAM 324 or the data loaded to the RAM 324 in accordance with access authority.

The access authority includes authority to only read data, authority to only write data, authority to both read and write data, and no authority to read and write data to the RAM 324. The RAM controller 325 includes or is connected to a register 326 where the authorities of the components to access the RAM 324 are recorded, and thus, authorizes the elements based on the records in the register 326.

Further, according to an exemplary embodiment, the RAM 324 may be divided into a plurality of storage areas in accordance with addresses, and the access authority may be differently set according to the storage areas. In an exemplary embodiment, a logical separation of the RAM 324 may be provided. The RAM 324 may be split into storage areas, each having different access rights by different components of the processor.

The access authority in the register 326 is set and recorded when the image processing apparatus 100 is manufactured, for example, and the register 326 may be a read only memory (ROM) so that the access authority cannot be modified by a third party.

A method of processing an encrypted content according to an exemplary embodiment, such as the third exemplary embodiment, will be described below with reference to FIG. 7.

Figure 7:
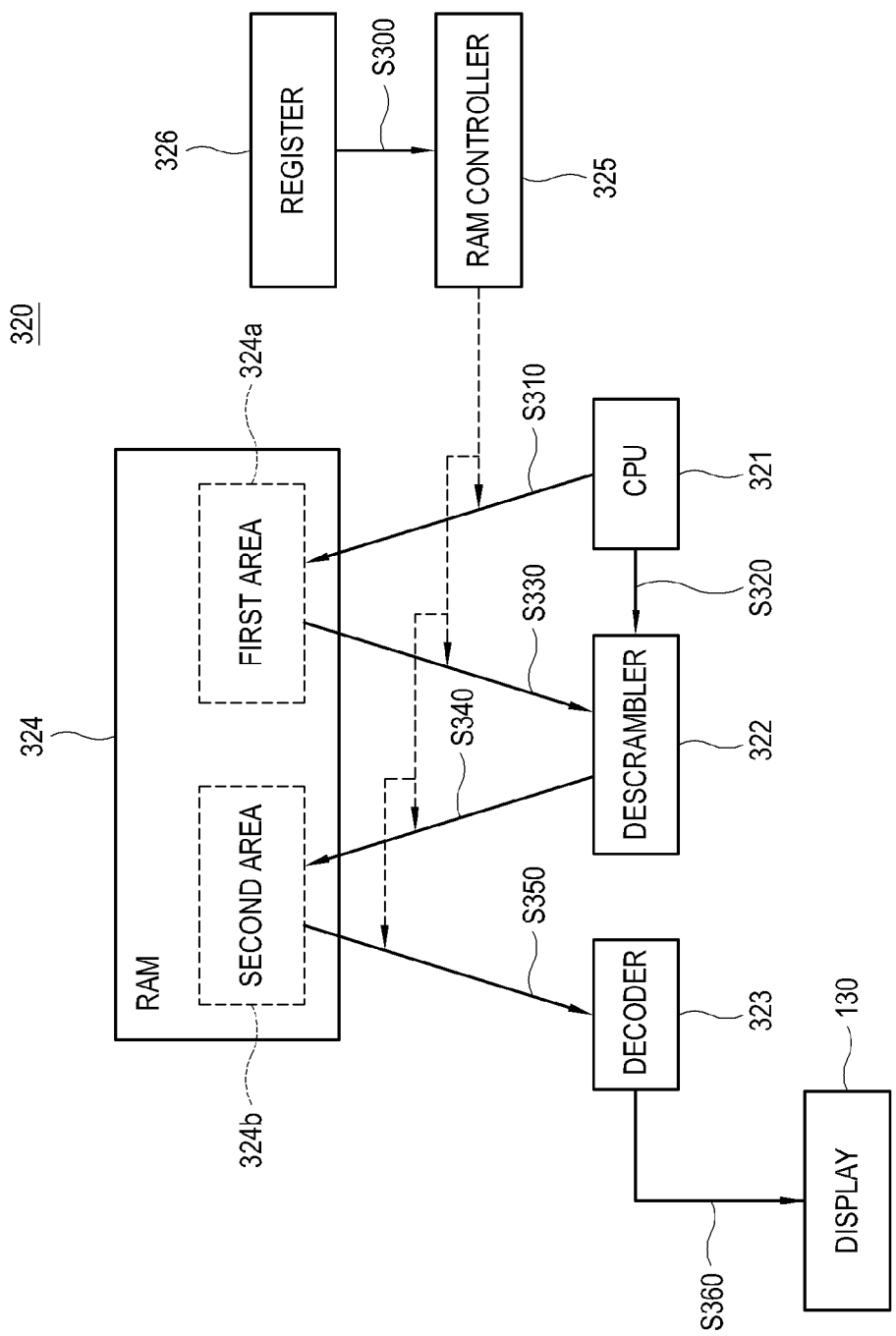
FIG. 7 is a view illustrating processing of encrypted content according to yet another exemplary embodiment.

FIG. 7 is a view illustrating processing of an encrypted content according to an exemplary embodiment such as the third exemplary embodiment.

As shown in FIG. 7, when the image processing apparatus 100 is turned on, in operation S300, the RAM controller 325 sets the respective access authorities of the components to the RAM 324 based on the records in the register 326. For example, the RAM controller 325 authorizes the CPU 321 to read from/write to data with regard to a first area 324a of the RAM 324, but blocks the CPU 321 from reading from/writing to data with regard to a second area 324b of the RAM 324. The RAM controller 325 authorizes the descrambler 322 to read data from the first area 324a and to write data to the second area 324b. The RAM controller 325 authorizes the decoder 323 to read data from the second area 324b.

The first area 324a and the second area 324b of the RAM 324 are areas of physical address ranges, which do not overlap with each other, among the storage areas of the RAM 324, according to an exemplary embodiment. The RAM 324 is designed not to fix the first area 324a and the second area 324b therein. That is, only values of address ranges corresponding to the first area 324a and the second area 324b are recorded in the register 326, and thus the RAM controller 325 controls the RAM 324 based on the records. If the first area 324a and the second area 324b are fixed in the RAM 324 when the RAM 324 is designed, it is impossible to apply exemplary embodiments after the RAM 324 is replaced by another one. Accordingly, information about the first area 324a and the second area 324b is recorded in the register 326 so that the RAM controller 325 can carry out exemplary embodiments even when the RAM 324 is replaced.

In operation S310, the CPU 321 loads the encrypted content data to the first area of the RAM 324. The CPU 321 may receive the encrypted data from the communication interface 110 or the storage 150. In operation S320, the CPU 321 transmits the decryption key for decrypting data to the descrambler 322.

In operation S330, the descrambler 322 reads the loaded encrypted data from the first area 324a. In operation S340, the descrambler 322 decrypts the encrypted data using this decryption key and loads the decrypted data to the second area 324b.

In operation S350, the decoder 323 reads the loaded data from the second area 324b. In operation S360, the decoder 323 decodes the read data and outputs the decoded data to the display 130.

Through the foregoing operations, the processor 320 according to an exemplary embodiment can process the encrypted data.

During the foregoing operations, an unauthorized third party may take over the control authority from the CPU 321 and leak the data. However, the raw data is loaded to the second area 324b, and the CPU 321 cannot have access to the second area 324b. Since the first area 324a to which the CPU 321 is accessible is loaded with the encrypted data, it is impossible to take the raw data without the decryption key.

Therefore, according to an exemplary embodiment, even if the single RAM 324 is used for the processor 320, it is possible to protect the raw data from being hacked by a third party who takes over the control authority of the CPU 321.

Although a few exemplary embodiments have been shown and described, it will be appreciated by those skilled in the art that changes may be made in these exemplary embodiments without departing from the principles, scope, and spirit of an inventive concept, which are defined in the appended claims and their equivalents.

What is claimed is:

1. An image processing apparatus comprising:
    a read-only memory configured to store register information;
    a processor configured to process encrypted data;
    a random access memory (RAM) comprising a first storage area to which the encrypted data processed by the processor is loaded, and a second storage area to which decrypted data is loaded, the second storage area being different from the first storage area;
    a descrambler configured to decrypt the encrypted data loaded to the first storage area by the processor, and load the decrypted data to the second storage area;
    a decoder configured to decode the decrypted data loaded to the second storage area, and output the decoded data to be displayed as an image on a display; and
    a RAM controller configured to access the read-only memory to obtain the register information, and based on the register information:
        authorize the processor to access the first storage area;
        block the processor from reading from and writing to the second storage area;
        authorize the descrambler to write data to the second storage area; and
        authorize the decoder to access the second storage area so that the decoder is configured to decode the decrypted data loaded to the second storage area.

2. The image processing apparatus according to claim 1, wherein the RAM controller is further configured to authorize the descrambler to access the second storage area.

3. The image processing apparatus according to claim 1, wherein the descrambler is further configured to receive a decryption key for decryption, from the processor.

4. The image processing apparatus according to claim 1, further comprising a register configured to store information about authorities of the processor and the decoder with respect to access to each of the first storage area and the second storage area,
    wherein the RAM controller is further configured to selectively restrict the access of the processor and the decoder to the RAM, based on the information stored in the register.

5. The image processing apparatus according to claim 4, wherein the register comprises a read only memory (ROM).

6. The image processing apparatus according to claim 1, wherein the first storage area and the second storage area comprise areas with physical address ranges not overlapping with each other.

7. A method of controlling an image processing apparatus, the method comprising:
 loading data to a random access memory (RAM) comprising a first storage area to which encrypted data is loaded and a second storage area to which decrypted data is loaded, the second storage area being different from the first storage area;
 accessing a read-only memory to obtain register information;
 based on the register information, authorizing a processor to access the first storage area, and blocking the processor from reading from and writing to the second storage area;
 decrypting the encrypted data loaded to the first storage area by the processor;
 loading the decrypted data to the second storage area, by a descrambler;
 authorizing the descrambler to write data to the second storage area;
 authorizing a decoder to access the second storage area so that the decoder decodes the decrypted data loaded to the second storage area; and
 outputting the decoded data to be displayed as an image on a display.

8. The method according to claim 7, further comprising authorizing the descrambler to access the second storage area.

9. The method according to claim 7, further comprising:
 receiving a decryption key for decryption, by the descrambler, from the processor;
 decrypting, by the descrambler, the encrypted data, using the received decryption key; and
 loading, by the descrambler, the decrypted data to the second storage area.

10. The method according to claim 7, further comprising:
 storing information about authorities of the processor and the decoder to access each of the first storage area and the second storage area, in a register; and
 selectively restricting the access of the processor and the decoder to the RAM, based on the information stored in the register.

11. The method according to claim 7, wherein the first storage area and the second storage area comprise areas with physical address ranges not overlapping with each other.

12. An image processing apparatus comprising:
 a read-only memory configured to store register information;
 a processor configured to process encrypted data;
 a random access memory (RAM) comprising a first storage area to which the encrypted data processed by the processor is loaded, and a second storage area to which decrypted data is loaded, the second storage area being different from the first storage area;
 a descrambler configured to decrypt the encrypted data loaded to the first storage area by the processor, and load the decrypted data to the second storage area;
 a decoder configured to decode the decrypted data loaded to the second storage area, and output the decoded data to be displayed as an image on a display; and
 a RAM controller configured to selectively restrict access of the processor to the RAM,
 wherein the RAM controller is further configured to:
  access the read-only memory to obtain the register information; and
  based on the register information, block the processor from reading from and writing to the second storage area, authorize the descrambler to write data to the second storage area, and authorize the decoder to access the second storage area so that the decoder is configured to decode the decrypted data loaded to the second storage area.

* * * * *